Oct. 29, 1940.  C. F. GEIGER ET AL  2,219,954
APPARATUS FOR DISTRIBUTING GRANULAR MATERIAL AND METHOD OF DISTRIBUTION
Filed Jan. 18, 1937  5 Sheets-Sheet 1

INVENTORS.
CHARLES F. GEIGER.
CHANNING P. CLAPP.
WILLIAM C. KEMPF.
BY
R C Benner
ATTORNEY.

Oct. 29, 1940.   C. F. GEIGER ET AL   2,219,954
APPARATUS FOR DISTRIBUTING GRANULAR MATERIAL AND METHOD OF DISTRIBUTION
Filed Jan. 18, 1937   5 Sheets-Sheet 5

INVENTORS.
CHARLES F. GEIGER.
CHANNING P. CLAPP.
WILLIAM C. KEMPF.
BY R.C. Benner
ATTORNEY.

Patented Oct. 29, 1940

2,219,954

UNITED STATES PATENT OFFICE 2,219,954

APPARATUS FOR DISTRIBUTING GRANULAR MATERIAL AND METHOD OF DISTRIBUTION

Charles F. Geiger, Metuchen, Channing P. Clapp, Woodbridge Township, Middlesex County, and William C. Kempf, Metuchen, N. J., assignors to The Carborundum Company, Niagara Falls, N. Y., a corporation of Delaware Application January 18, 1937, Serial No. 121,098

15 Claims. (Cl. 214—17)

This invention relates to improvements in apparatus for transferring granular material to and from containers for such material.

Granular material that is used in the manufacture of refractory or abrasive articles is stored in large quantities in a dry state in bins, and consists ordinarily of a mixture of particles whose sizes vary greatly. Failure to maintain a uniform quality in the output of any given type of such articles is very frequently traceable to segregation of granular material as a result of transfer to or from storage bins, to molds, etc. Segregation causes difficulties particularly in the manufacture of refractory articles where nonplastic materials of various grit sizes are employed and where it is desirable to control these grit sizes and their distribution in the main body of the material within relatively small ranges. Such difficulties occur, for example, especially in the manufacture of refractory articles that include one or more of such materials as silicon carbide, fused alumina, mullite, sillimanite, chromite, magnesite, calcined clay, silica, etc. Similar difficulties occur in the manufacture of abrasive articles, such as abrasive wheels. Again in the handling of gravel and stone for concrete it is desirable that in the handling and feeding processes the uniformity of distribution within the material be maintained in as uniform a state as possible. Generally, it may be said that mixtures of materials of different grain or grit sizes tend to segregate whenever such materials are moved, conveyed or allowed to flow. The minimizing of the degree of segregation in any handling process, therefore, is highly desirable in order that the finished product may be as uniform as possible.

Segregation of granular materials on delivery into a bin and segregation of such materials on withdrawal from a bin are discussed in an article in the Journal of the American Ceramic Society for October, 1925, pages 666–670. Some illustrations are there given as obtained from photographs of models of bins having a glass wall. Further illustrations of the phenomena of segregation of granular materials are given in Tonindustrie-Zeitung for 1935, pages 1258, 1259. The use of granular material from storage bins in which such segregation of particle sizes exists is likely to lead to the production of defective refractory or abrasive articles. Duplication of articles previously made and found to be satisfactory is made very difficult when some of the granular materials used in the course of manufacture are taken from storage bins in which such segregation exists.

Even, however, where granular material is uniformly distributed in a storage bin, it is necessary to withdraw the material in such a manner that the uniformity of distribution will not be disturbed in order to obtain consistent results in the course of a series of manufacturing operations in which material is drawn from time to time from the given bin. The technical problem of filling a storage bin with granular material is therefore closely connected with the problem of withdrawal of material from the bin.

As an example of a type of manufacture where close control of grit sizes is necessary, the manufacture of silicon carbide refractory articles, such as furnace linings, may be mentioned. Important properties of the final product, such as porosity, density, permeability, resistance to spalling, resistance to oxidation, etc., depend upon the maintenance throughout all the steps of the manufacture of very close control of the entire range of grit sizes. Similar problems are presented in the manufacture of abrasive wheels and in the filling of molds for the casting of many types of articles.

A great many mechanical devices were tried by the present applicants with more or less unsatisfactory results before the apparatus and methods described in detail below were conceived and put into successful operation.

The expressions "grain" and "granular materials" are used in describing the present invention to include materials in the entire range of sizes as normally used in the industries heretofore mentioned, and can include mineral matter, cereal grains, as well as artificially or synthetically formed materials of very different chemical compositions and physical properties.

The improved method and apparatus (for the transfer of granular material) which constitute the subject of the present invention are illustrated by the accompanying drawings in which.

Figures 1, 2, 3, 4:
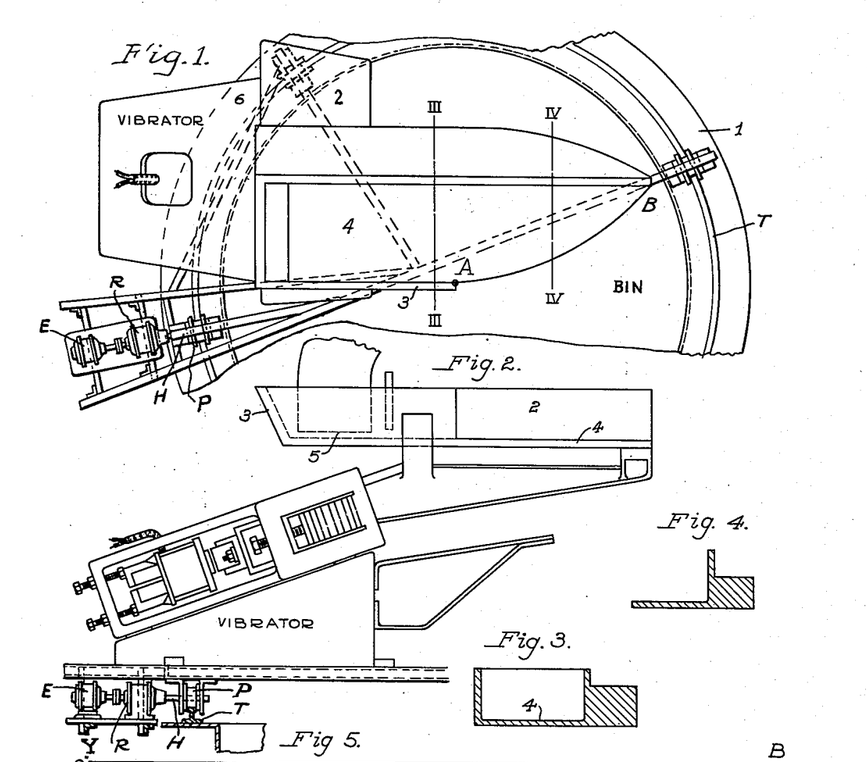
Figure 1 is a plan view of a rotatable vibrating feeder disposed above a storage bin for granular material.
Figure 2 shows in elevation the feeder which is shown in plan in Fig. 1.
Figure 3 is a section on the line III—III of Fig. 1, including a transverse section of the feeder trough.
Figure 4 is a section on the line IV—IV of Fig. 1, including a transverse section of the outlet portion of the feeding trough.

Referring first to Figures 1 and 2 of the drawings, a vibrating feeder 2, for example of the Jeffrey-Traylor type, is mounted for rotation about a vertical axis. A slow rotation of the feeder mechanism (including the grain hopper, trough and vibrator) around a vertical axis through A, which is in line with the central axis of the bin, may be produced for example by means of an electric motor E. This motor acts through a speed reducer R to rotate the feeder mechanism on the track T. The track T can be provided with teeth which are engaged by a pinion P on a shaft H that is turned slowly by means of the speed reducing mechanism R. The feeder trough 3 is disposed so that granular material is fed along a substantially horizontal surface 4 and over a curved edge AB from which the granular material falls downward in a substantially vertical direction instead of falling in the usual parabolic trajectory. One end A of the discharge edge lies on the axis of rotation of the vibrating feed arrangement that consists principally of the vibrator 6 and the trough 3. This point A also is situated vertically above the center of the bin to be filled. The outer end B of the discharge edge of the trough extends out nearly to the periphery of the bin.

The granular material is fed into one end of the trough from a hopper outlet 5. The main body of the hopper is placed above the trough and above the center of the bin. The hopper is rotated with the vibrating feeder. The hopper outlet 5 can be mounted at different heights above the base of the trough in accordance with the rate at which it is desired to feed the granular material, the outlet 5 being placed at greater heights above the base of the trough 3 for higher rates of feed.

The vibrating mechanism is not part of the present invention. An electromagnetic vibrator of the Jeffrey-Traylor type is indicated diagrammatically in the drawings. The rate of feed can be varied by means of a rheostat which controls the supply of electric current. The rate of feed may also be controlled by tilting the trough 3. When the trough slopes upwardly toward the discharge end, the rate of feed is slower than when the trough is horizontal. The rate of feed can be increased by tilting the trough so that it slopes downwardly toward the discharge end. The electric current may be an alternating current of any convenient frequency, such as 25 or 60 cycles per second, or may be interrupted so as to impart vibrational impulses to the trough several hundred or thousand times per minute.

Figure 5:
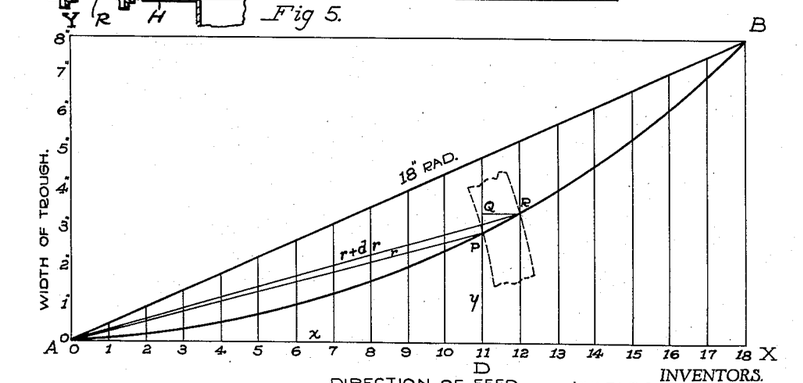
Figure 5 shows on an enlarged scale the curve which the outlet edge of the feeder trough follows, starting from an origin point A on the axis of rotation of the trough and machine.

In order to effect a uniform distribution of granular material over the cross-sectional area of the bin, the discharge edge of the trough is formed so that the width PQ (see Fig. 5) of any elementary portion of the edge PR is proportional to the annular area of the bin which receives granular material over the edge element PR as the trough is revolved around a vertical axis through the point A. In Fig. 5 the coordinates AY and AX are parallel respectively to the width and length of the trough. The distance indicated by AY in the drawing is proportional to the width of the trough. The distance AB is approximately equal to the radius of the bin on the same scale. The granular material is fed along the base of the trough in a direction parallel to AX in a layer of substantially uniform thickness. This layer can be very thin for the most uniform distribution as the granular material falls into the bin, the thickness of the layer not greatly exceeding the diameters of the largest granules. The dashed lines drawn transversely through P and R in Fig. 5 indicate a portion of the annular area of the bin. This particular annular area receives the discharge over the element of the edge PR as the trough is slowly rotated above the bin. The elementary annulus just mentioned has an area approximately equal to $2\pi r.dr$ where $dr$ is the difference in length between the radii AP and AR and $2\pi r$ is approximately the mean length of the circumference of the elementary annulus.

Denoting the distance PQ by the expression $dy$, the differential equation of the curve of the discharge edge APRB is:

$$dy = k.2\pi r.dr$$

Simple integration of this equation gives the curve equation:

$$y = k\pi r^2$$

or (1) $$y = Kr^2$$

where K is a constant for the curve.

This equation may be written in ordinary rectangular coordinates:

(2) $$y = K(x^2+y^2)$$

where $y$ represents the perpendicular distance of the point P in Fig. 5 from the line AX and $x$ the distance of P from the line AY.

The value of the constant K can be determined where the width of the trough and the radius of the bin are given. For example, for a storage bin of three feet diameter which is fed from a rotatable trough 8 inches in width insertion of the extreme values of $y$ and $r$ in Equation 1 gives $$8 = K(18)^2 = 324K \text{ or } K = .0247$$

The following table gives corresponding values of the radial distances $r$ of a point P on the discharge curve from the axis of rotation of the trough and of the ordinate $y$, that is the distance of the point P from the side AX of the trough.

| Radial distance | Ordinate |
|---|---|
| 0 | 0 |
| 1 | 0.0247 |
| 2 | 0.099 |
| 3 | 0.223 |
| 4 | 0.395 |
| 5 | 0.618 |
| 6 | 0.889 |
| 7 | 1.21 |
| 8 | 1.58 |
| 9 | 2.00 |
| 10 | 2.47 |
| 11 | 2.72 |
| 12 | 3.56 |
| 13 | 4.17 |
| 14 | 4.84 |
| 15 | 5.56 |
| 16 | 6.32 |
| 17 | 7.14 |
| 18 | 8.00 |

While the Equation 2 above gives a smooth curve, it is not essential from a practical standpoint that the discharge edge be smooth. The discharge edge may be rough or slightly jagged while its general contour conforms to Equation 2.

It will be observed that, with a vibrating feeder in which the granular material is propelled along the trough in a substantially horizontal direction with small velocity, the distance through which the material falls does not seriously affect the deposition of a uniform layer, because the granular material is not discharged over the edge of the trough in any appreciable trajectory. Segregation of the granular material does not occur appreciably, therefore, when the upper level of the grain in the bin is raised uniformly, regardless of the state of fullness of the bin into which the granular material is being discharged. With such a feeder grain can be dropped in a uniform layer regardless of whether the bin is nearly full or nearly empty, and there appears to be little difficulty in filling bins of any practical height with uniformly distributed grain.

With extremely fine materials, however, where slight dusting may interfere with the uniformity of the deposited material, the rotating feeder may simultaneously be elevated through the use of a suitable mechanism so that the feeder chute is always maintained at a substantially uniform distance above the surface of the material that has last been deposited.

Mechanically actuated feeders having drives similar to the Juby, Buhler, or others that produce the proper oscillatory or vibratory motion, may be used instead of an electromagnetically operated vibrator, although the latter type appears to be preferable from the standpoint of relative simplicity and ease of installation as compared with the mechanical drives just mentioned.

Figures 6, 7, 8, 9, 10, 11, 12, 13:
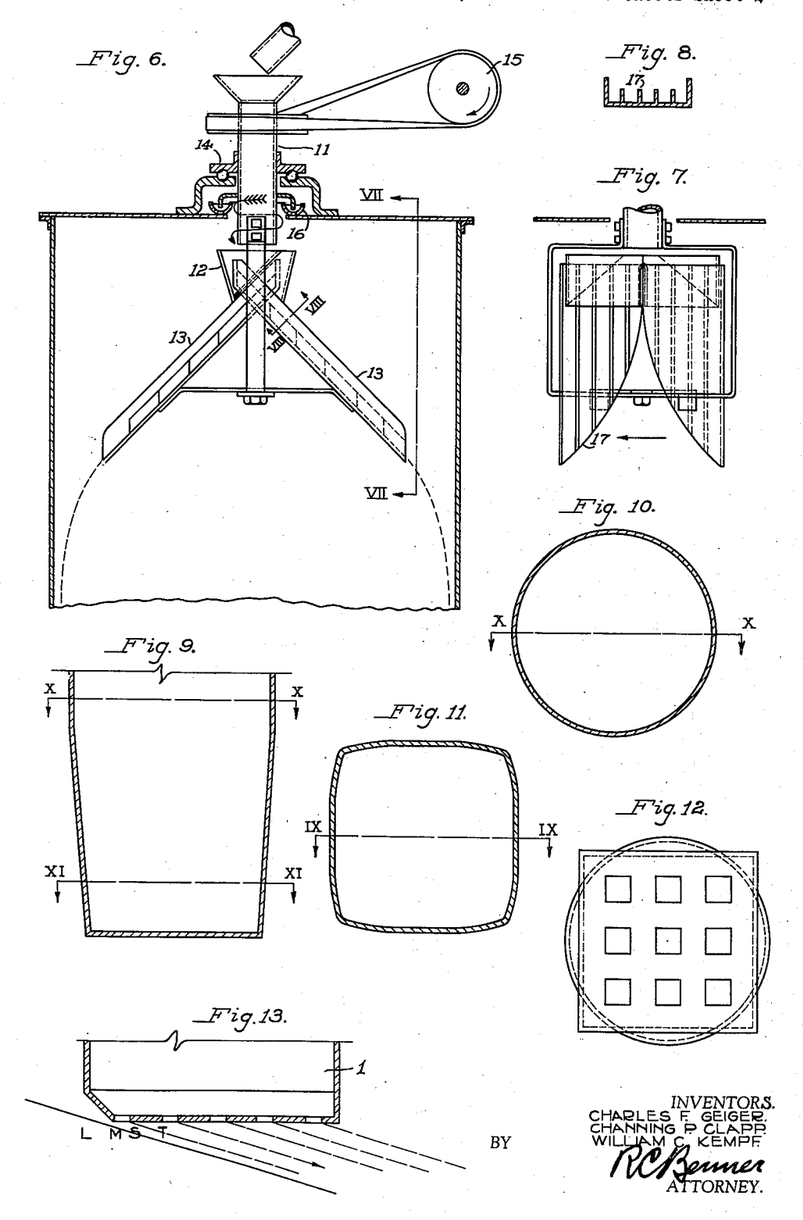
Figure 6 is an elevation illustrating diagrammatically a modified form of feeder for a storage bin for granular material.
Figure 7 is an elevation showing the discharging surfaces of the feeding troughs and taken on the line VII—VII of Fig. 6.
Figure 8 is a transverse section of a feeding trough taken on the line VIII—VIII of Fig. 6.
Figure 9 is a fragmentary elevation illustrating the lower portion of a storage bin for granular material.
Figure 10 is a horizontal section on the line X—X of Fig. 9.
Figure 11 is a horizontal section on the line XI—XI of Fig. 9.
Figure 12 is a plan view of the bottom of the storage bin.
Figure 13 is a sectional elevation showing a portion of the lower part of the bin and indicating diagrammatically a travelling belt in the preferred position for transporting granular material from the storage bin.
Figure 13A:
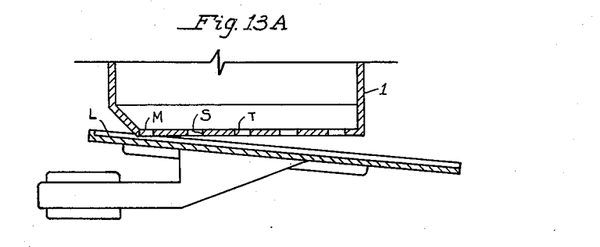
Figure 13A is a fragmentary elevation showing vibrating discharging mechanism in suitable position relatively to the base of the bin.
Figure 13B:
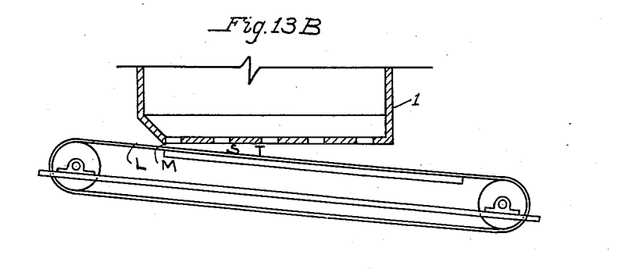
Figure 13B is a fragmentary elevation illustrating means for driving a travelling disharging belt and means for preventing the belt from sagging where it passes under the bin.

A modified form of the invention comprises a rotatable feeder which is illustrated in Figures 6, 7 and 8. No vibrating feeder is employed in the apparatus illustrated in these views. The feeder troughs or chutes are rotated as before and are provided with similarly curved discharge edges. The granular material to be distributed falls through a rotating feeding pipe 11 into a distribution hopper 12 and thence onto inclined chutes 13, the distribution hopper and the chutes being rotated about the same vertical axis as the rotating feed pipe. An annular bearing is shown at 14 for the support of the rotating system, and driving means are indicated at 15. A dust seal is indicated at 16. This seal prevents leakage of fine granular material through the space between the feeding pipe and the cover of the bin. The inclination of the rotating chutes is approximately the same as the angle of repose of the granular material. The granular material therefore is discharged from the curved edges of the chutes with a small velocity and the falling particles describe slight trajectories. In order to obtain substantially uniform distribution of the granular material as it falls into the bin it is desirable that an elevating mechanism be employed for the feeder chutes so that the chutes are raised as rapidly as the upper surface of the granular material in the bin rises. It has also been found advisable in this modified form of feeder to employ a number of fins extending down along the chute in a direction parallel to its sides as indicated at 17 in Figures 7 and 8. These fins form a number of sluiceways in each trough and compel the moving granular material to follow a direction longitudinally down each trough to the discharge edge.

Figure 14:
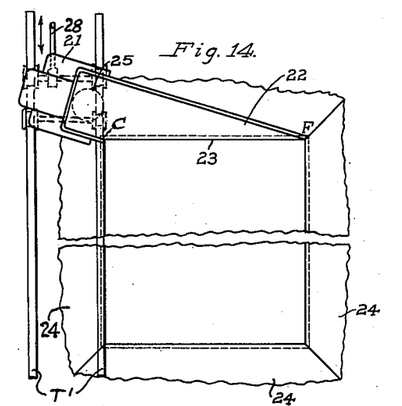
Figure 14 is a plan view illustrating apparatus that includes a vibrating feeder which is used to distribute granular material with substantial uniformity in a bin having a rectangular cross-section.
Figure 15:
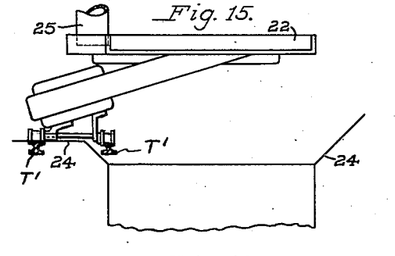
Figure 15 is an elevation of the apparatus shown in Figure 14.

The apparatus described thus far has been intended for use primarily in the distribution of granular material in a bin of circular cross-section, the discharging apparatus being rotated about a vertical axis which is in line with the central axis of the bin. The apparatus which is somewhat diagrammatically illustrated in Figures 14 and 15 is adapted for distributing granular material in bins that have a rectangular cross-section. The feeding apparatus can be reciprocated slowly on the tracks T¹ by means of a connecting rod 28 which is moved back and forth at approximately constant speed by means for example of a heart-shaped cam which is not shown in the drawings.

A vibrating feeder 21 is used to feed granular material in a thin sheet along a horizontally disposed trough 22. The trough 22 has a discharge edge 23 which extends from a point C on one side of the trough to a point F on the opposite side of the trough. The length CF is approximately equal to the width of the rectangular bin. The feeding apparatus is moved at substantially constant speed in a horizontal direction along the length of the bin, that is in a direction at right angles to CF. The feeder is given a movement across the top of the bin at substantially constant speed by any suitable reciprocating mechanism that includes for example a heart-shaped cam. Such a cam can be designed to give the mechanism a substantially constant speed except at the end points of the reciprocating movement. At these end points the direction of movement has to be reversed and should not be reversed too suddenly for smooth running of the mechanism. To prevent accumulation or heaping up of granular material against the end walls of the bin the rate of feed of granular material can be reduced during the times of reversal of motion of the feeder, for example, by cutting off for a short time the electric current that actuates the vibrator. The top of the bin is shown surrounded by lateral extensions or flaps 24. These flaps guard against spillage of granular material although over-running of the bin in such a way as to cause spillage is to be avoided. Granular material is supplied to the vibrating feeder through a flexible pipe or hose 25.

Figure 16:
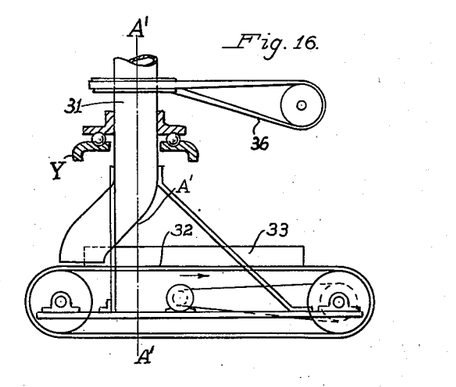
Figure 16 is a side elevation indicating apparatus in which a belt conveyor is used in the distribution of granular material to a bin of circular cross-section, the grain being discharged over the side of the belt.
Figure 17:
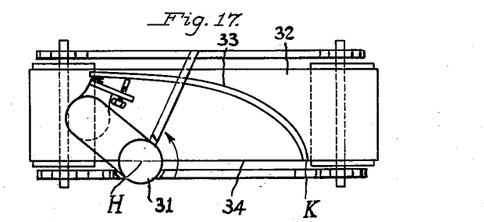
Figure 17 is a plan view of the apparatus shown in Figure 16.

The apparatus illustrated by means of Figures 16 and 17 is adapted for use in distributing granular material into a bin of circular cross-section.
Granular material is fed through a discharge pipe 31 onto the surface of a belt conveyor 32. The granular material is transported on the surface of the belt toward a deflector 33 against which the granular material tends to pile up but from which the granular material is deflected and rolls over the side or discharge edge 34. The feeding apparatus, including the hopper and the belt conveyor, is rotated about a vertical axis A' which is in line with the central axis of the circular bin. The feeding apparatus can be supported on a standard Y by means of a thrust bearing and rotated slowly about the vertical axis A' by means of driving mechanism indicated generally at 36. The deflector 33 is supported on some part of the feeder outside of the belt conveyor and is shown in Figure 16 as attached to the feeder pipe 31. The deflector 33 is mounted so that its position can be adjusted relatively to the upper surface of the belt conveyor. This deflector is also made of flexible material so that its shape (as well as its position) can be adjusted so that the amount of granular material discharged per unit length over the edge HK increases along the discharge edge from H to K.
The best position and shape of the deflector 33 are those which produce in conjunction with a given speed of the conveyor belt a discharge over the edge of the belt which is zero at H and which increases along the edge from H to K in such a manner that the discharge per unit length is directly proportional to the distance from the axis of rotation A' which passes through the point H.

The distance HK is approximately equal to the radius of a cylindrical bin which is disposed below the feeder and whose cylindrical axis is in line with the vertical axis about which the feeder is rotated.

While the upper surface of the belt conveyor is indicated as being approximately horizontal in the drawing, the belt conveyor may be adjusted so that the upper surface is inclined slightly to the horizontal and so that the granular material which reaches the deflector 33 is urged slightly by gravity toward the side HK of the belt, and more material is discharged over the edge adjacent the end K than over an equal length adjacent the end H.

Figure 18:
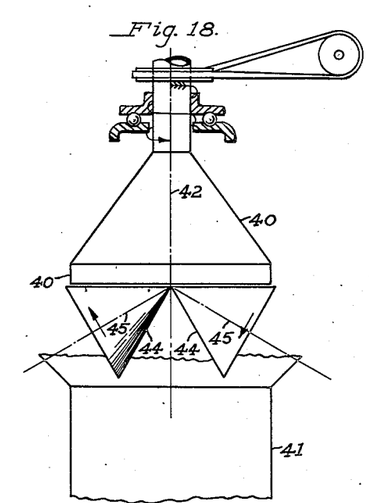
Figure 18 is a side elevation illustrating apparatus in which cones having a compound rotary movement are used to distribute granular material in a bin that has a circular cross-section.
Figure 19:
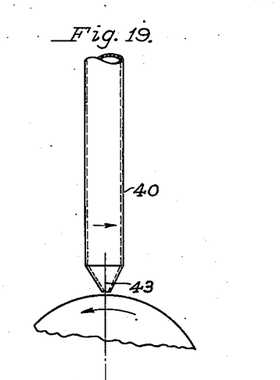
Figure 19 is a partial end elevation of the apparatus indicated in Figure 18.

In the form of apparatus illustrated in Figures 18 and 19 the feed hopper 40 is extended laterally over the cylindrical bin 41, the principal axis 42 of the hopper being disposed above and in line with the cylindrical axis of the bin. The hopper discharges through a slit 43 whose length is approximately equal to the diameter of the bin 41.
The rate of feed from the different parts of the slit is controlled by the rotations of cones 44 about their respective axes 45. The hopper and the cones are rotated slowly about the vertical axis 42, the axes 42 and 45 all being disposed in a vertical plane that includes the principal axis of the slit 43. The feeding system is mounted and rotated in a manner similar to that described in connection with Figure 16. The cones 44 have a compound rotary motion. These cones rotate with the hopper 40 about the vertical axis 42 but have additional rotations about their respective axes 45. Adjacent the apices of the cones 44 the discharge from the hopper 40 is relatively very small because the movement of the adjacent conical surface is very small near the center of the slit and the apices of the cones. Further away from the apices of the cones the discharge of the granular material from the hopper will be greater, the discharge per unit length from the slit increasing along the slit with the distance from the apices of the cones. The granular material that is discharged from the slit 43 slides down over the conical surfaces and falls into the bin, the amount of grain deposited increasing with the distance of the falling grain from the cylindrical axis of the bin as should be the case in order to build up the level of the grain in the bin without formation of heaps or mounds which tend to cause segregation of the grain. The directions of rotation of the cones about their respective axes and the direction of rotation of the whole feeder system about the vertical axis 42 are shown by the arrows in Figure 18. These directions of rotation are such as to decrease the horizontal component of the velocity of the falling grain near the periphery of the bin, that is the speeds of the cones about their respective axes may be so adjusted relatively to the speed of the whole system about a vertical axis that the grain which falls off the surface of the cones into the outer portions of the bin will fall nearly straight down. Similar effects will be obtained in the case of the grain which is discharged further in, that is nearer the cylindrical axis of the bin.

Figure 20:
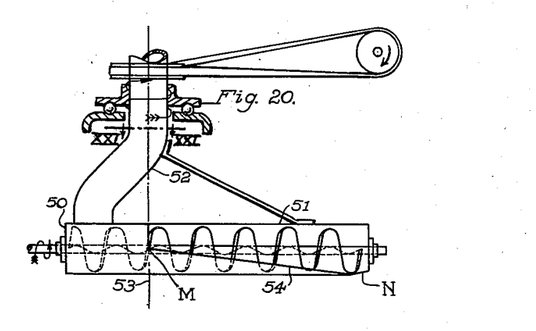
Figure 20 is a side elevation illustrating the utilization of a screw conveyor for distributing granular material in a bin that has a circular cross-section.
Figure 21:
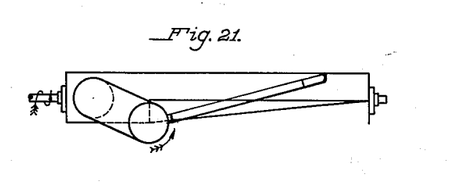
Figure 21 is a plan view of the apparatus illustrated in Figure 20.

In the apparatus shown in Figures 20 and 21 granular material is distributed into a bin of circular cross-section from a rotary feeder which includes a screw conveyor 50. The screw conveyor pushes grannular material along a trough 51, the trough being supplied by means of a feed pipe 52. The distributing apparatus (including the feed pipe, trough and screw conveyor) is rotated slowly about a vertical axis 53 which is in line with the cylindrical axis of a bin disposed below the feeder. The feeding system is supported and rotated in a manner similar to that described in connection with Figure 16. The granular material is discharged over the inclined edge 54. This edge is so inclined that the granular material discharged per unit length of the edge increases from zero at a point M on the axis 53 to a maximum value at N at the end of the trough. The distance MN is approximately equal to the radius of the cylindrical bin which is to be filled.

Figure 22:
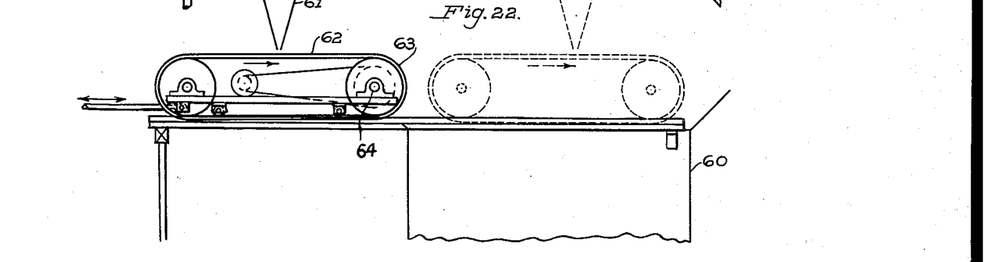
Figure 22 is a side elevation illustrating the utilization of a simple belt conveyor for distributing granular material into a bin of rectangular cross-section.
Figure 23:
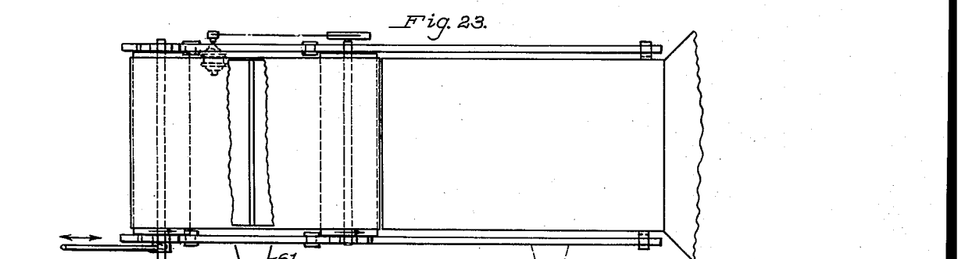
Figure 23 is a plan view of the apparatus illustrated in Figure 22.

The apparatus shown in Figures 22 and 23 is adapted to distribute granular material in a bin 60 that has a rectangular cross-section. Granular material is supplied from a hopper 61 to the upper surface of a conveyor belt 62. The granular material is discharged into the bin as it is carried down over the sloping surface 63 of the conveyor pulley 64. The feeder, comprising the two pulleys with the belt and hopper, is moved back and forth over the bin, the speed of travel of the feeder being substantially constant except during the reversal periods when the discharge surface of the belt is approximately over one or other of the opposite ends of the bin. To prevent heaping up of granular material near the ends of the bin methods similar to those described in connection with Figures 14 and 15 and for a similar purpose may be employed. The position of the belt conveyor shown in full lines at the left of Fig. 22 and the position illustrated by dashes at the right represent the two extreme positions of the belt conveyor.

While the forms of feeding apparatus described in connection with Figures 16, 17, 20 and 21 are described as used for the distribution of granular material in bins of circular cross-section, these forms of apparatus may be adapted for the distribution of granular material in bins of rectangular cross-section by mounting the feeders for reciprocation instead for rotation and suitable variation of the shape of the discharge edges or scrapers. In this use with bins of rectangular cross-section the discharge edge is moved back and forth slowly at substantially constant speed except near the points of reversal when the discharge edge is over one end or other of the bin.

Inasmuch as the problem of prevention of segregation of grit sizes is only partly solved after the grain has been properly introduced into a storage bin, it will be understood that the problems connected with the removal of grain from the bin must also be solved in order to limit the segregation of grain to the narrowest possible ranges during the processes of manufacture. As a result of research in connection with the present invention the conclusion has been reached that the unloading mechanism may be used in a number of forms, such as travelling belts, magnetically vibrated flat plates or chutes, or mechanically vibrated plates or chutes. The surfaces of such conveyors or transmitters on which the grain is received from the bin outlets extend laterally and longitudinally outside of the bin outlets. These grain receiving surfaces are adjacent the bottom of the bin but are nearer one end of the bin than the opposite end, extending at a slight downward angle in the direction of the flow of the grain as indicated in Fig. 13. If a vibrating trough or chute is used below the bin outlet, the grain receiving surface should be flat. If a flexible belt is employed, which generally is preferable because of the smaller cost, the belt under the bin should be supported by means of a flat plate or grating that will prevent any sagging of the belt in either direction.

It will be noted that with the types of rotary feeder described above and illustrated in the drawings it is desirable to employ circular bins, whereas for the discharging means referred to above and illustrated particularly in Fig. 13 of the drawings, it is preferable that the bottom of the bin through which the grain is discharged be square or rectangular. The square section is preferred for the lowest portion of the discharge end of the bin, and the adjacent lower portion of the bin is formed of specially shaped members which through a height of several feet change the cross-sectional shape of the bin from a circular area to a square area of substantially the same size. By this means a minimum lateral movement of the grain is allowed within the bin so that segregation caused by such movement is reduced as much as possible. In cases where extreme accuracy of control is not necessary, the bin may be retained in a circular form for its entire height; but the substantially square bottom is the preferred design where the closest control is desired. With a square bottom the latter is perforated with symmetrically and uniformly spaced holes or discharge openings which are preferably square and of the same size for all of the various holes. The holes are spaced proportionally to the areas which they drain. For bins of ten or twelve feet in diameter the holes may be 15 inches to 5 inches on a side. For somewhat smaller bins the discharge openings are made correspondingly smaller and preferably only a few inches along an edge. It is desirable that the area of the holes comprise an appreciable percentage of the area of the bottom of the bin, for example, 20 to 50 percent as a good mean range.

It is essential that the belt or vibrating chute used as the unloading means be placed so that the granular material is carried away from the bin at a slight downward inclination. The belt or chute should (as illustrated in Fig. 13) intersect the prolongation of the bin bottom at a point L whose distance LM from the nearest edge of the first row of holes is equal to the distance ST between holes. Slight provision for adjustment of this distance and of the slope of the belt is also desirable. To set the belt or chute at the proper angle and to have the spacings as just described, it is sometimes necessary to have a portion of the bottom edge of the bin set at an angle, as indicated in Fig. 13, so that the extension of the belt may project upward beyond the horizontal plane of the bottom of the bin.

In the description which has been given of the arrangement for the discharge of granular material the base of the bin has been described as square or rectangular. This arrangement is preferable when a flat belt is used to transfer the granular material from the base of the bin.

It will be noted that discharging devices of any of the types here described are self-closing in that downward flow of the grain in the bin is possible only when the belt is moving or the chute is vibrating or reciprocating. When the conveying mechanism is stopped the flow of grain from the bin likewise ceases. It will be observed also that in a discharge mechanism of this type there are several factors of control possible so that groups of bins thus equipped may be used for proportioning the amount of materials coming from different bins. The various fractions can be collected on another conveyor and fed to mixing machinery, etc. The methods of control just referred to comprise, for example, adjustment of the speed of the belt or of the rate of vibration of the chute, adjustment of the inclination of the grain receiving surface to the bottom of the bin, and limiting of the duration of times of operation of the various individual conveying means which transfer granular material from the various storage bins.

The efficacy of such unloading equipment is evidenced by the fact that the profile or contour of the upper surface of the grain in a storage bin remains substantially the same while the bin is being emptied under the conditions described above until the lowest part of the upper surface reaches the orifices of the bin. For example, if the top surface of the grain in the storage bin is inclined at approximately the angle of repose of the material (due to one-sided supply of grain to the bin in the filling operation), this inclined surface will retain substantially the same slope during the discharging operation until the lowest edge of the inclined surface reaches the bottom of the bin. A similar phenomenon occurs when the upper surface of the grain in the bin is conical (due, for example, to supply of the grain to the bin from a small pipe whose outlet is above the center of the bin). These phenomena indicate that the flow of granular material proceeds with substantial uniformity downwardly across the transverse sections of the main portion of the bin. In addition to the visual evidence just described numerous screen analyses have demonstrated that unloaders of the type disclosed do not substantially alter distribution of the grain as it existed in the bin. Where the bin is filled with granular material distributed uniformly as to particle sizes in the various parts of the granular mass, the unloading means described and illustrated is effective in maintaining this desirable distribution during the transfer from the bin to molds or other containers used in the process of manufacture.

The rotary loading device described in detail above and illustrated particularly in Figures 1, 2, 3 and 4 can be used for other purposes than the loading of bins. For example, in the foundry industry the filling of molds with granular material having a uniform density is frequently of importance in order that uniform venting and escape of gases may prevail and so that gas pockets and other flaws do not form in the castings. For the application of our spreading device to such a purpose it would generally be preferable that the mold be rotated beneath the feeder (instead of the feeder above the mold) from the point of view of simplicity of the mechanism involved. Moreover, it is not essential that the mold be circular in section as long as proper shields are provided so that an excess of molding sand not intended for any part of the mold would be deflected outwardly away from the mold rather than into the mold. With such provision it is apparent that molds of an odd shape might be uniformly filled with sand even though part of the spreader at times extends beyond the mold, since the feeder described and illustrated will lay down a bed of material uniform in thickness over any area less than that described by the effective rotating radius of the discharge edge of the feeder. The excess material will merely fall to the outside of the mold. The rotation of the feeder or mold should proceed very slowly and is preferably reversed at intervals.

In the manufacture of abrasive wheels also the apparatus described above provides means for filling the circular molds (ordinarily used to contain the abrasive mix during the shaping of the mix) in layers of substantially uniform density. Such distribution in the mold is highly desirable in order that pressed wheels may be of uniform density and hardness throughout. At present the abrasive industry uses some rather elaborate devices in an effort to obtain uniformity of distribution of granular material throughout the mix in the mold. The results are in general not yet satisfactory. It is obvious in abrasive wheel manufacture that if more material is placed in one part of the wheel mold than in another part having the same volume, a non-uniform density results in the wheel because of the relatively non-plastic and non-flowing character of the wheel mixes even under the high pressures used. Such variations in density not only produce variations in hardness or "grade" over the grinding surface of the wheels from time to time as the wheel is used and consequently non-uniform grinding characteristics, but these variations in density tend to throw the wheel out of balance, which is a serious matter because of the high speed at which many of these wheels are used. While it is true that by one method or another the balance of such a wheel can be corrected while the wheel is new, the condition is subject to change during the use of the wheel and frequently no subsequent attempt is made to re-balance such a wheel. It is evident, therefore, that the distributing mechanism herein disclosed is of material value in the production of grinding wheels of more uniform grade and of better balance than is the case where segregation of material takes place during manufacture.

While a number of industrial applications of the improved loading and unloading devices described above have been described at some length, there are many other industrial applications in which such devices can be advantageously used. Likewise there are other methods and combinations of methods not herein revealed that will come within the broad scope of the following claims.

We claim:

1. The steps in the processing of granular material which comprise distributing said material into a containing vessel in thin layers of substantially uniform thickness and composition by means of a spreading mechanism traversing the space above said vessel, and withdrawing said material from the bottom of the vessel in such a manner as to cause the contour of the upper surface of the material in the vessel to remain substantially the same while the vessel is being emptied, the materials being removed at a slight angle to the horizontal, which angle is less than the angle of repose of the granular material on the removal surface.

2. Apparatus for distributing granular material into a cylindrical container in substantially uniform layers, said apparatus comprising means for causing said material to flow continuously in a stream of substantially uniform thickness over an approximately horizontal surface terminated by a discharge edge which starts from a point on the central axis of the container, at which point the edge lies in a direction substantially parallel to the flow of grain on the horizontal surface and from which point the edge extends to the circumference of the bin in a curve which is so shaped that the rate of flow over each unit length of the discharge edge is directly proportional to the annular area swept out by said unit length in a complete revolution of the discharging edge about said central axis.

3. Apparatus for the handling of granular material intended for the manufacture of articles where substantially uniform distribution of particle sizes is necessary, said apparatus comprising a cylindrical storage bin for granular material, a feeder for said storage bin mounted for rotation about a central vertical axis passing through the storage bin, said feeder being adapted to feed granular material along a trough toward a discharge edge which starts substantially from said axis of rotation and extends toward a point whose radial distance from the axis is approximately equal to the radius of the bin, said discharge edge being curved so that the width of any element of the edge measured at right angles to the direction of the flow of the granular material is proportional to the annular area of the bin fed by said element, a base for said storage bin having a plurality of discharge openings spaced with substantial uniformity with respect to a horizontal section of the bin, and a conveyor having a grain receiving surface disposed under said openings adjacent thereto, said conveyor being adapted to hold the granular material in the bin when said grain receiving surface is stationary and to feed the grain from said outlets along a slight downward slope when the grain receiving surface is in motion.

4. Apparatus for distributing and storing granular material comprising a storage bin and a vibrating trough adapted to feed granular material to said bin in an approximately horizontal direction along the base of the trough, said trough being rotatable about a vertical axis that is tangent to one side of the trough and having a discharge edge on its base which starts from said axis and extends to the opposite side of the trough in such a curve that the perpendicular distance of any point on said curve from the first mentioned side of the trough is proportional to the square of the distance of said point from the axis of rotation.

5. Apparatus for distributing and storing granular material comprising a storage bin and a vibrating trough adapted to feed granular material to said bin in an approximately horizontal direction along the flat base of the trough, said trough being mounted for rotation about a vertical axis that is tangent to one side of the trough and having a discharge edge on its base which starts from said axis and extends to the opposite edge of the trough in such a curve that the width of a small element of the edge measured perpendicular to the direction of flow along the trough is proportional to the annular area swept out by said element during a complete rotation of the trough.

6. The grain handling apparatus described in claim 4 in which the vibrating feeder is actuated by means of very rapid impulses which propel the granular material over the discharge edge with only a slight horizontal component of velocity.

7. The grain handling apparatus described in claim 4 in which the storage bin has a circular cross-section at the top and a substantially square cross-section at the bottom, the change from circular cross-section to square cross-section being effected by gradual change of section between the two levels.

8. Apparatus for filling a cylindrical container with granular material, said apparatus comprising a feeder mounted for rotation about a vertical axis in line with the central axis of the container below, a trough included in said feeder and having a supporting transmission surface bounded by a discharge edge, said discharge edge extending from a point adjacent the axis of rotation and above the central part of the container to a point located at the opposite end of the trough and above a peripheral part of the container, said discharge edge being curved so that the amount of grain discharged over any given length along the edge is proportional to the area of the annulus swept out by said length in the same time.

9. The method of distributing granular material into cylindrical containers which comprises moving the grain in a layer of uniform thickness by means of rapid impulses of small amplitude along an approximately horizontal surface toward a discharge edge over which the grain falls in an approximately vertical sheet and rotating the feeder with its discharge edge to distribute the falling grain in a layer of substantially uniform thickness to all parts of the container, the rate of discharge being controlled so that the discharge per revolution between successive equidistant radial distances from the central axis of the container is directly proportional to the radial distance from said central axis.

10. The method of distributing granular material into containers of rectangular cross-section which comprises moving the grain by means of rapid impulses of small amplitude along an approximately horizontal surface toward a straight discharge edge over which the grain falls in an approximately vertical sheet of approximately uniform thickness and producing substantially uniform relative reciprocation between the discharge edge and the container to distribute the falling grain to all parts of the container.

11. The method of distributing granular material into cylindrical containers which comprises moving the grain in a layer of substantially uniform thickness by means of rapid impulses of small amplitude along an approximately horizontal surface toward a discharge edge over which the grain falls in an approximately vertical sheet, and producing uniform relative rotation between the container and the discharging edge to distribute the falling grain over the cross-sectional area of the container, the rate of discharge being controlled so that the discharge per revolution between successive equidistant radial distances from the central axis of the container is directly proportional to the radial distance from said central axis.

12. The method of distributing granular material into containers of rectangular cross-section which comprises moving the grain by means of rapid impulses of small amplitude along an approximately horizontal surface toward a straight discharge edge over which the grain falls in an approximately vertical sheet, and reciprocating the feeder with its discharge edge over the container to distribute the grain over the cross-sectional area of the container, the deposit of grain through any given area above the receiving surface being repeated in like amount from the same part of the distributing edge for each successive reciprocation of said edge over the container.

13. The method of distributing granular material into a container which comprises moving the grain by means of rapid impulses of small amplitude along an approximately horizontal surface in a sheet of substantially uniform thickness toward a discharge edge, continuously altering the position of said edge at a substantially constant speed with respect to the surface of a receiving container, and so governing the rate of flow of grain per unit length of the edge that the grain deposit in the container is distributed with substantial uniformity over substantially the entire cross-section of the container during each complete traversal of the discharging edge over the cross-section of the container.

14. Apparatus for distributing and holding granular material and a vibrating trough adapted to feed granular material to said container in an approximately horizontal direction along the base of the trough, means for producing relative rotary motion between the vibrating trough and container and about a vertical axis which is tangent to one side of the trough, and a discharge edge on the base of the trough, which edge starts from said axis and extends to the opposite side of the trough in such a manner that the perpendicular distance of any point on said curve from the first mentioned side of the trough is proportional to the square of the distance of said point from the axis of relative rotation.

15. Apparatus for distributing and holding granular material comprising a container and a vibrating trough adapted to feed granular material to said container in an approximately horizontal direction along the flat base of the trough, means for producing relative rotary motion between the vibrating trough and container and about a vertical axis which is tangent to one side of the trough, and a discharge edge on the base of the trough which starts from said axis and extends to the opposite side of the trough in such a curve that the width of a small element of the edge measured perpendicular to the direction of flow of grain along the trough is proportional to the annular area in the container hit by the grain falling over said edge element in one complete relative rotation between said edge element and the container.

CHARLES F. GEIGER.
CHANNING P. CLAPP.
WILLIAM C. KEMPF.